(No Model.)

G. H. PERKINS.
OIL CAN.

No. 394,390. Patented Dec. 11, 1888.

WITNESSES.
Ch. B. Shepherd
F. Norman Dixon

George H. Perkins
INVENTOR.
By his Attorneys,
W. C. Strawbridge
J. Bonsall Taylor

UNITED STATES PATENT OFFICE.

GEORGE H. PERKINS, OF PHILADELPHIA, PENNSYLVANIA.

OIL-CAN.

SPECIFICATION forming part of Letters Patent No. 394,390, dated December 11, 1888.

Application filed February 7, 1888. Serial No. 263,235. (No model.)

*To all whom it may concern:*

Be it known that I, GEORGE H. PERKINS, a citizen of the United States, residing in the city and county of Philadelphia, in the State of Pennsylvania, have invented a new and useful Improvement in Oil Cans, of which the following is a specification.

My invention relates especially to receptacles for the storage of oils, but it is also applicable to other vessels for containing other liquids.

The chief object of my invention is the construction of an oil tank of such character that when oil is drawn off from it, any impurities which the oil may contain will, by the subjection of the oil to an action of filtration, be retained in the receptacle, while, only the unfiltered oil will be drawn off; and it comprehends the provision of a cheap, efficient, and easily removable filter, the superficial area of which is large compared with size of the orifice through which the liquid is drawn from the vessel.

In the accompanying drawings I illustrate, and herein I describe my invention as applied to an oil-storage vessel of the character usually employed in retail shops to contain oil intended to be drawn off in small quantities to suit small purchasers, and which are frequently accessible to and penetrated by various foreign matters that, when drawn off and consumed with the oil, seriously impair its illuminating quality.

Figure 1:
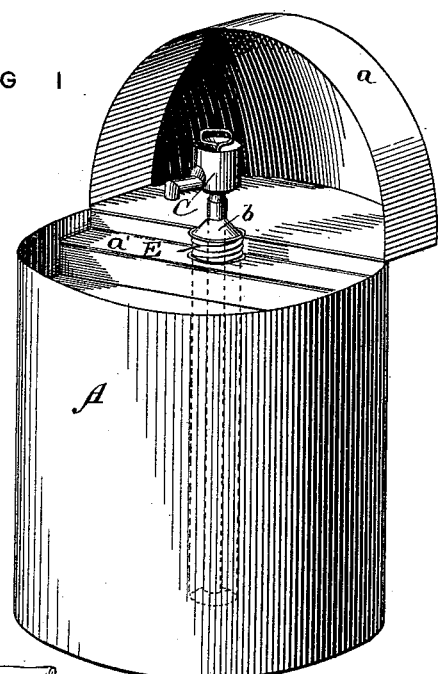
Figure 3:
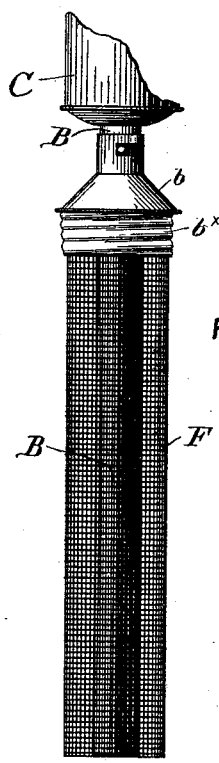
Figure 4:
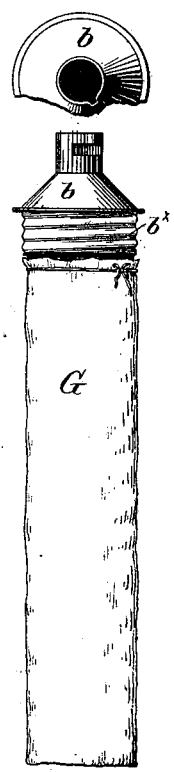
Figure 5:
Figure 2:
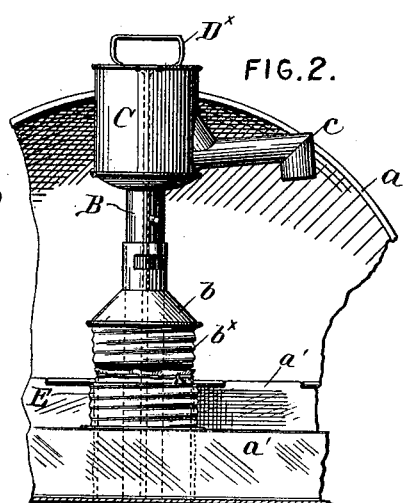
Figure 6:
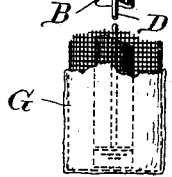

In the drawings, Figure 1 represents in perspective an oil vessel of the type indicated and embodying my invention. Fig. 2 is a fragmentary elevational view of parts of the can and filter. Fig. 3 is a side elevation of a wire cloth cylinder for retaining the filtering medium, and of the parts of the pump tube with which it is connected. Fig. 4 is a similar view of the same parts, the cylinder being covered by the filter bag. Fig. 5 is a detail view of a modified form of filter. Fig. 6 is a bottom plan of the pump tube, showing the valve therein, the surrounding wire cloth cylinder and filter bag being shown in section.

Similar letters of reference indicate corresponding parts.

In the drawings, A represents a storage can, of the type mentioned, of which $a$ is the outer hinged lid, $a'$ a permanent angular or flanged diaphragm situated conveniently just within the chine or upper part of the main body of the can, and $a^\times$ an inner lid, hinged to said diaphragm. The diaphragm, in the region where the inner lid is hinged to it, occupies a lower elevation than its main body, for the convenience of placing vessels under the spigot. The breadth of the diaphragm and the inner lid is such that they together span, inclose, or extend entirely across the interior of the can. A pump tube B, supported in position by being connected to the diaphragm as shown, extends down within the can to a short distance above its bottom, and within this tube is fitted a pumping apparatus of any convenient character. The upper end of the tube, above the diaphragm, is provided with a bulb or head C, and a delivery spigot $c$.

The pump within the tube B consists merely of a reciprocatory head D, fitted with a handle-provided manipulating rod $D^\times$. The lower end of the tube is provided conveniently with an ordinary hinged drop valve $D'$.

By means of the pump the liquid contents of the can are drawn off in such quantities as may be desired.

My invention comprehends a filter which incloses or incases the pump tube, and through which the liquid contained in the tank and which the pump is to elevate, is drawn.

For the convenient introduction and support of the filter itself the following arrangements may be resorted to. In Figs. 1, 2, 3, and 4, the orifice in the diaphragm $a'$ through which the tube passes is of greater diameter than the tube, and is provided with an annular vertically projecting sleeve or flange E, in which a screw thread is spun or otherwise formed. The tube is provided with a conical collar $b$, slipped upon and connected to it in any convenient manner, as, for instance, by the bayonet-joint or stud and slot connection shown. To the periphery of the collar is connected a depending flange $b^\times$ in which a screw thread is formed and which adapts it to screw within the sleeve or flange E. To the lower end of the flange $b^\times$ is attached the upper end of a wire network cylinder F, which is as long as the pump tube.

The filter itself, which I have lettered G, consists of a web of filtering material applied so as to inclose the tube B.

I find it convenient to form the filter as a bag or cylinder of textile fabric, which is both cheap and effective,—and I prefer to employ such material. The filter, when thus made of textile fabric, is mounted upon the wire cylinder F, and is supported in place thereon by having its upper end tied by a piece of wire or twine, as shown in Figs. 3, 2 and 4.

It is obvious that by my invention a filter of such extensive area is provided that it will continue operative notwithstanding the clogging of a large number of its pores.

In applying the device when of the form and arrangement above described, the collar $b$, cylinder F, and filter bag G, are applied to the pump tube B, and all are then together entered through the orifice in the diaphragm $a'$, and the threaded flange $b^\times$ screwed into place within the threaded collar or flange E.

In Fig. 5 is shown a filter bag provided with internal rings $f$, which retain the bag in a properly distended condition. This construction may be resorted to when desired as a substitute for the wire cylinder F hereinbefore described. When this ring-distended filter bag is employed, it may be supported in any such manner as convenience of manipulation may suggest. A convenient method of support would be afforded by the employment of hooks attached to the transverse diaphragm about the tube orifice, upon which the bag might be hung.

It is obvious that the filter need not extend over the entire length of the tube B, but that it may be formed to surround or inclose only the lower end thereof,—its own upper end being in such case tightly held about the cylinder or pump tube so as not to allow the entrance of oil unless by passage through its body.

The cylinders or rings may be dispensed with, although by retaining the bag in position against the suction of the pump they add to the effectiveness of the device.

Having thus described my invention, I claim:—

1. In an oil-can, the combination of a pump tube, a pumping device fitted within said tube, and a filter bag of textile material inclosing and secured to the said tube, the whole being so arranged with reference to the said can as to be capable as a whole of being mounted therein and removed therefrom, as specified.

2. In an oil-can, the combination of a pump tube, a pumping device fitted within said tube, a filter bag inclosing and secured to the said tube, distending devices within said bag, the whole being so arranged with reference to the can as to be capable as a whole of being mounted therein and removed therefrom, as specified.

3. In an oil can, the combination of a pump tube, a pumping device fitted within said tube, a filter bag of textile material inclosing and secured to the said tube, the said devices being so connected as to be capable as a whole of application to and removal from the can, an orifice in the lid of the can of sufficient size to admit said devices, a screw threaded flange surrounding said orifice, and a screw threaded collar mounted upon the upper part of the tube and adapted to said flange, as specified.

In testimony that I claim the foregoing as my invention I have hereunto signed my name this 6th day of February A D 1888.

GEORGE H. PERKINS.

In the presence of
J. BONSALL TAYLOR,
WM. C. STRAWBRIDGE.